United States Patent [19]

Aoshima et al.

[11] Patent Number: 5,234,039
[45] Date of Patent: Aug. 10, 1993

[54] SEALING DEVICE FOR FUEL SUPPLY PORT OF FUEL TANK FOR USE IN VEHICLES

[75] Inventors: Kazuyuki Aoshima, Fujisawa; Hiroya Abe, Hiroshima, both of Japan

[73] Assignee: Keeper Company, Ltd., Tokyo, Japan

[21] Appl. No.: 730,449

[22] Filed: Jul. 16, 1991

[51] Int. Cl.$^5$ .................. B60K 15/04; F16J 15/32
[52] U.S. Cl. .................. 141/312; 141/388; 220/86.2; 277/207 R; 277/152; 285/345; 285/379
[58] Field of Search .......... 141/312, 98, 383, 392, 141/368, 388, 286, 301, 302, 304; 220/86.1, 86.2, 746; 277/207 A, 207 R, 152; 285/345, 346, 379

[56] References Cited

U.S. PATENT DOCUMENTS

| | | | |
|---|---|---|---|
| 2,466,527 | 4/1949 | Wolfram | 285/379 X |
| 4,018,461 | 4/1977 | Bram | 285/345 X |
| 4,120,521 | 10/1978 | Parmann | 285/345 X |
| 4,147,368 | 4/1979 | Baker et al. | 277/207 A X |
| 4,171,818 | 10/1979 | Moskowitz et al. | 277/152 X |
| 4,299,412 | 11/1981 | Parmann | 285/345 X |
| 4,572,523 | 2/1986 | Guettouche et al. | 277/207 A |
| 4,579,354 | 4/1986 | Vassallo et al. | 277/207 A |
| 4,630,749 | 12/1986 | Armstrong et al. | 220/746 X |
| 4,693,483 | 9/1987 | Valls | 277/207 A |
| 4,714,172 | 12/1987 | Morris | 220/746 X |
| 4,747,508 | 5/1988 | Sherwood | 220/86.2 |
| 4,765,504 | 8/1988 | Sherwood et al. | 220/86.2 |
| 4,826,028 | 5/1989 | Vassallo et al. | 277/207 A |
| 4,834,398 | 5/1989 | Guzowski et al. | 277/207 A |
| 4,883,103 | 11/1989 | Szlaga et al. | 141/312 X |
| 4,919,297 | 4/1990 | Ohasi | 220/86.2 |
| 4,946,060 | 8/1990 | Sherwood et al. | 220/86.2 |
| 5,035,272 | 7/1991 | Kawase | 141/312 |
| 5,040,804 | 8/1991 | Back | 277/152 X |

FOREIGN PATENT DOCUMENTS

| | | |
|---|---|---|
| 0112965 | 7/1984 | European Pat. Off. . |
| 3336863 | 5/1984 | Fed. Rep. of Germany . |
| 2420712 | 11/1979 | France .................. 285/345 |
| 2063392 | 6/1981 | United Kingdom . |

OTHER PUBLICATIONS

Tamiyoshi et al., "Fuel injecting Port", Patent Astracts of Japan, vol. 015, No. 073, (M-1084) Feb. 20, 1991 & JP-A-2 298 658 (Toyoda Gosei) Dec. 11, 1990.

Primary Examiner—Henry J. Recla
Assistant Examiner—Casey Jacyna
Attorney, Agent, or Firm—Wegner, Cantor, Mueller & Player

[57] ABSTRACT

A sealing device for the fuel supply port of a fuel tank for use in vehicles includes a nozzle seal made of a rubber-like elastic material. The nozzle seal is provided in an annular groove formed in an inner peripheral surface of a fuel supply port guide in such a manner as to be movable in a radial direction. The inner peripheral portion of the nozzle seal can make contact with a fuel supply nozzle with an interference provided therebetween. A seal is provided on an outer peripheral or side surface of the nozzle seal to seal a gap in said annular groove. A reinforcing ring is provided on an outer peripheral portion of the nozzle seal. The reinforcing ring has axial and radial portions. The radial portion of the reinforcing ring is located adjacent to the fuel supply port guide on a side of the annular groove adjacent to the tank.

3 Claims, 3 Drawing Sheets 5,234,039

SEALING DEVICE FOR FUEL SUPPLY PORT OF FUEL TANK FOR USE IN VEHICLES

BACKGROUND OF THE INVENTION

1. Field of the Invention

The present invention relates to a sealing device provided at the fuel supply port of a fuel tank for vehicles, such as automobiles.

2. Description of the Related Art

To prevent leakage of fuel vapor during refueling, a sealing device such as that shown in FIG. 5 is conventionally used. This sealing device includes a fuel supply port guide 4 and a shutter 8. The fuel supply port guide 4 has in its inner peripheral surface an annular groove 5, and a nozzle seal 1 is held in the annular groove 5. When a fuel supply nozzle 7 is inserted into the sealing device, the inner periphery of the nozzle seal 1 is brought into contact with the outer peripheral surface of the fuel supply nozzle, thereby preventing leakage of fuel vapor during refueling.

However, since the fuel supply nozzle 7 has various diameters and since there exists tolerance on the inner peripheral surface of the fuel supply port guide, in this conventional sealing device, the fuel supply nozzle 7 tends to be inserted in an eccentric fashion relative to the fuel supply port. This makes application of the face pressure of the nozzle seal 1 to the fuel supply nozzle 7 non-uniform in its circumferential direction, and thus deteriorates the sealing performance. Furthermore, when the eccentricity of the fuel supply nozzle 7 is great, it may be impossible for the nozzle seal 1 to follow the movement of the fuel supply nozzle 7, generating a gap between the nozzle seal 1 and the nozzle 7.

SUMMARY OF THE INVENTION

An object of the present invention is to provide a sealing device for the fuel supply port of a fuel tank for use in vehicles which is directed to overcoming the aforementioned problems of the conventional techniques.

To achieve this, the present invention provides a sealing device for a fuel supply port of a fuel tank for use in vehicles, which comprises a fuel supply port guide having an annular groove in an inner peripheral surface, a nozzle seal made of a rubber-like elastic material and provided in said annular groove in such a manner as to be movable in a radial direction, an inner peripheral portion of said nozzle seal being able to contact with a fuel supply nozzle with an interference provided therebetween, a sealing means provided on an outer peripheral or side surface of said nozzle seal to seal a gap in said annular groove, and a reinforcing ring provided on an outer peripheral portion of said nozzle seal, said reinforcing ring having axial and radial portions, said radial portion being located adjacent to said fuel supply port guide on side of said annular groove adjacent to the tank.

In the present invention, even when the fuel supply nozzle is eccentrically inserted into the fuel supply port, the face pressure of the nozzle seal can be applied to the fuel supply nozzle uniformly in its circumferential direction, because the nozzle seal freely moves in the radial direction in the annular groove and thereby follows the movement of the fuel supply nozzle.

Furthermore, reinforcing ring restricts swelling of the sealing member due to the fuel, and the radial portion of the reinforcing ring guides the movement of the nozzle seal in the radial direction and thereby makes it smoothly follow the movement of the fuel supply nozzle.

DESCRIPTION OF THE PREFERRED EMBODIMENTS

Figure 1:
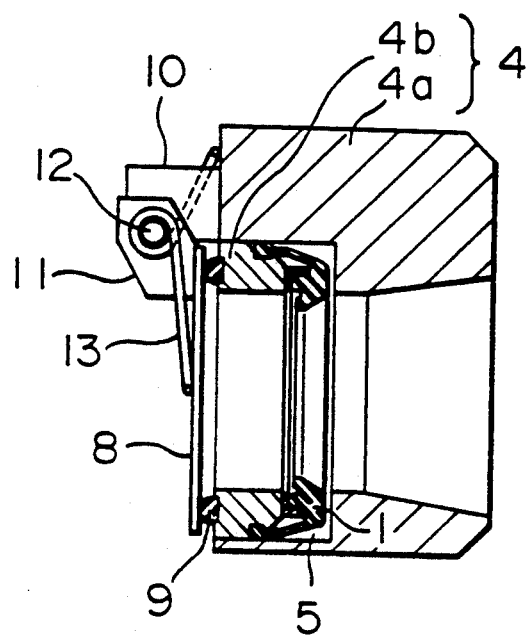
FIG. 1 is a cross-sectional view of a first embodiment of a fuel supply port sealing device according to the present invention.

An embodiment of the present invention will be described with reference to FIGS. 1 to 3.

A sealing device for the fuel supply port of a fuel tank for use in vehicles includes a fuel supply port guide 4 made of a metal or a synthetic resin, the fuel supply port guide 4 consisting of two members 4a and 4b each having a through-hole at a center thereof to guide a fuel supply nozzle 7 to the fuel supply port of a fuel tank for vehicles, a nozzle seal 1 mounted in an annular groove 5 formed in the inner peripheral surface of the fuel supply port guide halfway in the fuel supply port, a packing 9 provided at the end face of the fuel supply port guide 4, and a shutter 8. The fuel shutter 8 has a shutter mounting portion 11 which is pivotally mounted by a pin 12 on a bracket 10 provided on the side of the fuel supply port guide 4 which is close to the fuel tank. A spring 13 wound around the pin 12 presses the shutter 8 against the packing 9.

The nozzle seal 1 is made of a rubber-like elastic material exhibiting excellent oil resistance and low-temperature resistance and not easily swelling, such as fluoro silicone rubber. To maintain the sealing property, the nozzle seal 1 has an inner peripheral portion 1a which can make contact with the outer peripheral surface of the fuel supply nozzle 7 with an interference therebetween. The fuel supply nozzle inserting side of the nozzle seal 1 is tapered such that it enlarges toward the outside in order to facilitate insertion of the fuel supple nozzle 7.

To restrict swelling of the nozzle seal 1 and to maintain the circularity of the nozzle seal 1 by moving the entirety of the nozzle seal 1 when the fuel supply nozzle 7 is eccentrically inserted into the fuel supply port and thereby prevent reduction in the sealing property, a reinforcing ring 2 is provided at an outer peripheral portion 1b of the nozzle seal 1. The reinforcing ring 2 consists of axial and radial portions and has a substantially L-shaped cross-section. The reinforcing ring 2 is made of a metal or a synthetic resin. The radial portion of the reinforcing ring 2 is located adjacent to the fuel supply port guide 4 on the fuel tank side of the annular groove 5. The reinforcing ring 2 is brought into contact with that fuel supply port guide 4 at least when the fuel supply nozzle 7 is inserted and thereby guides the movement of the nozzle seal 1 in the radial direction. Therefore, there should be no composition of the nozzle seal 1 at least on the side of the surface of the reinforcing ring 2 which makes contact with the fuel supply port guide 4 on the fuel tank side of the annular groove 5.

Figure 2:
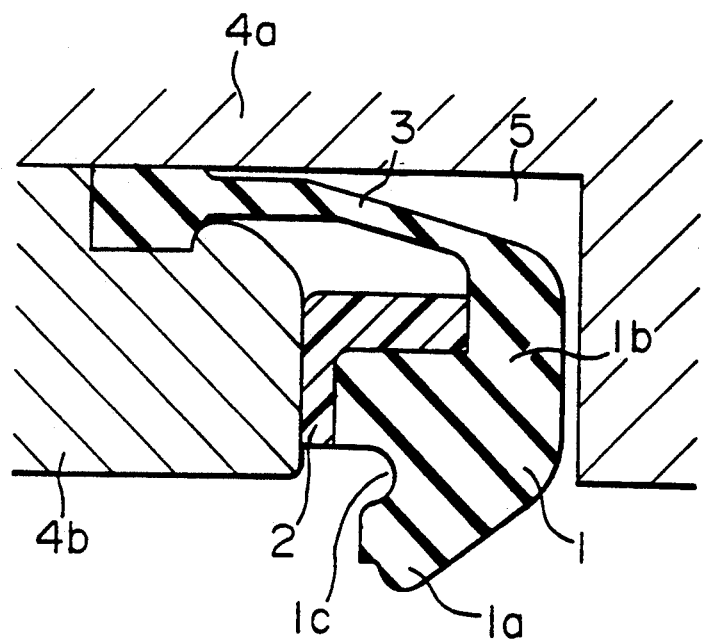
FIG. 2 is an enlarged view of a nozzle seal portion of FIG. 1.
Figure 3:
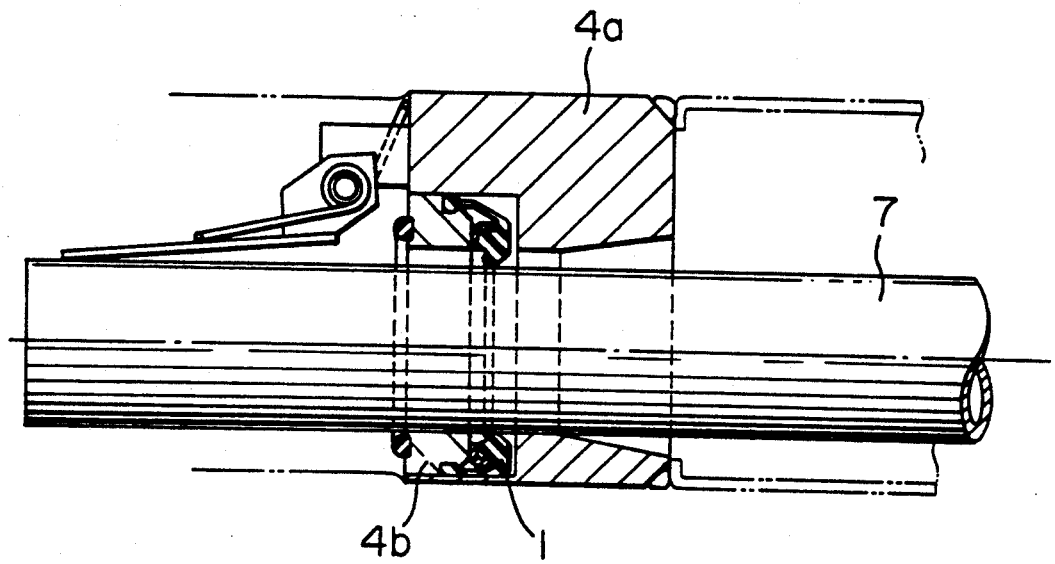
FIG. 3 is a cross-sectional view showing a state in which a fuel supply nozzle is eccentrically inserted into the embodiment of FIG. 1.
Figure 4:
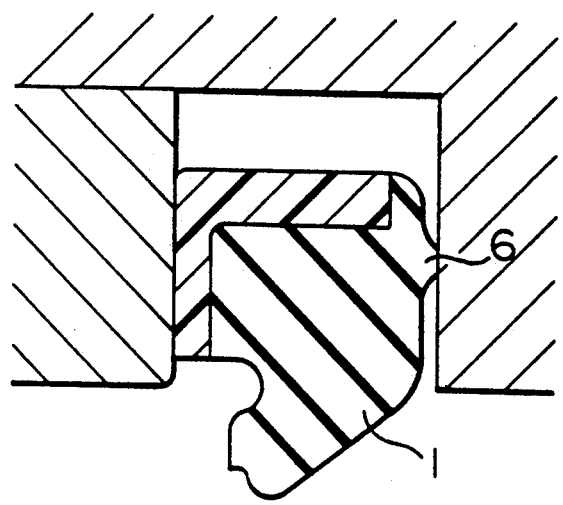
FIG. 4 is an enlarged view of the essential parts of a second embodiment of the fuel supply port sealing device according to the present invention.
Figure 5:
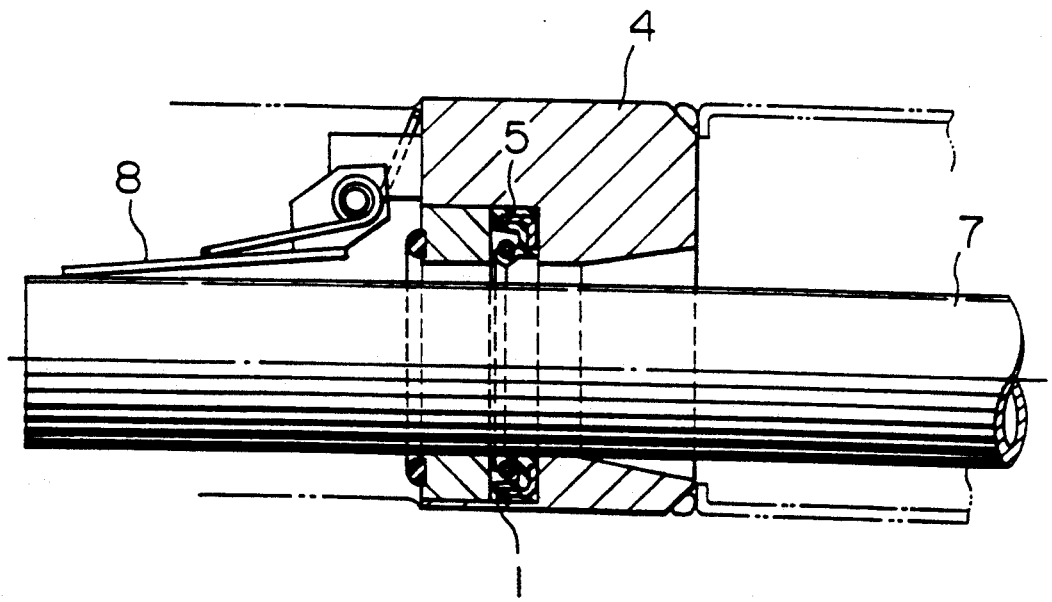
FIG. 5 is a cross-sectional view of a conventional fuel supply port sealing device.

As shown in FIGS. 1 to 3, a bellows 3 is provided on the outer peripheral surface of the nozzle seal 1. The bellows 3 serves as the sealing means which prevents leakage of the fuel vapor without interfering the movement of the nozzle seal 1 in the radial direction. The outer peripheral portion of the bellows 3 is held between the two members 4a and 4b which constitute the fuel supply port guide 4. Alternatively, the sealing means may have at least one annular protrusion 6 provided on the outer side surface of the nozzle seal 1 in such a manner that it can contact with the fuel supply port guide 4 on the outer side of the annular groove with the interference therebetween, as shown in FIG. 4.

The nozzle seal 1 is provided such that a gap is formed between the outer side surface of the nozzle seal 1 and the fuel supply port guide 4 on the outer side of the annular groove so as to absorb deformation of the nozzle seal 1 which would occur when the nozzle seal 1 swells due to the fuel or when the fuel supply nozzle is inserted into or drawn from the fuel tank. Also, the inner diameter of the radial portion of the reinforcing ring 2 is made substantially the same as that of the fuel supply port guide 4, and an escape portion 1c is provided near the inner surface of the radial portion of the reinforcing ring 2 so as to absorb deformation of the nozzle seal 1 which would occur during the insertion of the fuel supply nozzle.

Having described the invention as related to the embodiments shown in the accompanying drawings, it is our intention that the present invention be not limited by any of the details of description, but various changes and modifications may be made in the invention without departing from the spirit and scope thereof.

As will be understood from the foregoing description, in the fuel supply port sealing device according to the present invention, the nozzle seal follows eccentric insertion of the fuel supply nozzle to maintain the sealing property of the sealing device. It is therefore possible to prevent leakage of the fuel vapor during the refueling.

What is claimed is:

1. A sealing device for a fuel supply port of a fuel tank for use in vehicles, comprising:
    a fuel supply port guide having an annular groove in an inner peripheral surface;
    a nozzle seal made of a rubber-like elastic material and provided in said annular groove in such a manner as to be movable in a radial direction, an inner peripheral portion of said nozzle seal being able to contact with a fuel supply nozzle with an interference provided therebetween;
    sealing means provided on said nozzle seal to seal a gap in said annular groove;
    a reinforcing ring provided on an outer peripheral portion of said nozzle seal, said reinforcing ring being movable along with said nozzle seal in such a manner as to displace the entire reinforcing ring radially with respect to the annular groove of said fuel supply port guide, said reinforcing ring having axial and radial portions, said radial portion being located adjacent to said fuel supply port guide on a side of said annular groove adjacent to said tank.

2. A sealing device as in claim 1, wherein said sealing means is provided on an outer peripheral surface of said nozzle seal.

3. A sealing device as in claim 1, wherein said sealing means is provided on a side surface of said nozzle seal.

* * * * *